March 9, 1954  H. R. DAVIDSON  2,671,609
COLOR MIXTURE COMPUTER
Filed Sept. 12, 1950
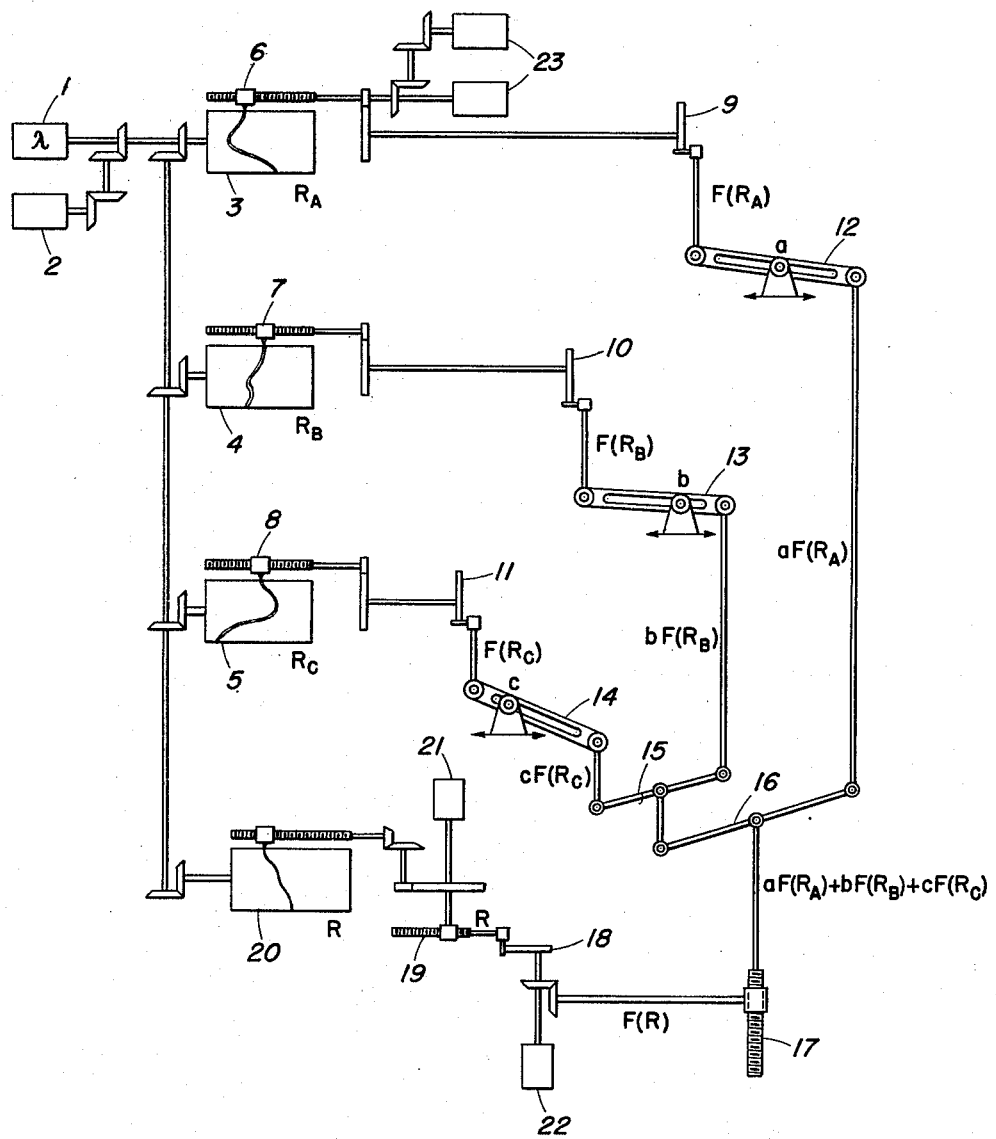
Hugh R. Davidson
INVENTOR
BY
ATTORNEY Patented Mar. 9, 1954

2,671,609

UNITED STATES PATENT OFFICE 2,671,609

COLOR MIXTURE COMPUTER

Hugh R. Davidson, Easton, Pa., assignor to General Aniline & Film Corporation, New York, N. Y., a corporation of Delaware Application September 12, 1950, Serial No. 184,493

3 Claims. (Cl. 235—61)

This invention relates to a color mixture computer and more particularly to a computer adapted to predict the color or tristimulus values of color mixtures.

If $R_A$, $R_B$ and $R_C$ represent the reflectances or transmittance of three colorants in a given medium or subtrate, and if R represents the reflectance or transmittance of a mixture of these three colorants in the proportions $a$, $b$ and $c$, then one generally may write (1) $\quad F(R) = aF(R_A) + bF(R_B) + cF(R_C)$ In other words, some function F of R can be found which will be additive in mixtures. In the case of solution mixtures, for example, $$F(R) = \log \frac{1}{R}$$

The tristimulus values of the mixture will be given by (2) $\quad \begin{aligned} X &= \int E\bar{x}Rd\lambda \\ Y &= \int E\bar{y}Rd\lambda \\ Z &= \int E\bar{z}Rd\lambda \end{aligned}$ The automatic tristimulus integrator shown and described in my copending application, Serial No. 6,541, filed February 5, 1948, solves Equation 2 automatically, if R is fed into it, therefore if the value of R can be determined from Equation 1 and fed to the integrator, tristimulus values of a mixture may be determined to within an accuracy set by the limits of validity of Equation 1 for any given function F. The device of the present invention performs this calculation automatically and may therefore be used in conjunction with the automatic tristimulus integrator of the aforementioned copending patent application, to predict the color, or the tristimulus values, of any colorant mixture for which the appropriate function F is known.

The invention is shown schematically in the drawing. 1 is a selsyn receiver which, in the second method of operation below, repeats wavelength (λ) from a suitable recording spectrophotometer and is servoed by motor 2. In the first type of operation below, 2 is operated as a constant speed drive motor and 1 is operated as a selsyn transmitter which transmits wavelength, or a constant speed, to an automatic tristimulus integrator. 3, 4 and 5 are cylinders mechanically coupled to rotate with 1. On these cylinders are placed the spectrophotometric curves of the three component colorants. Curve followers 6, 7 and 8 are used to transmit the values $R_A$, $R_B$ and $R_C$ through gears to three cams 9, 10 and 11. These three cams are identical and are cut according to the function F, or displacements of the cam edge from a given diameter are proportional to this function. Displacement of the three cam followers must then be $F(R_A)$, $F(R_B)$ and $F(R_C)$. Multiplying levers 12, 13 and 14 are used to multiply the functions by the appropriate constants $a$, $b$ and $c$. The products $aF(R_A)$, $bF(R_B)$ and $cF(R_C)$ are then summed on the adding bars 15 and 16. The displacement of 16 must then be proportional to $F(R)$. A rack and pinion drive 17 is used to convert to a rotary motion for driving cam 18 which is cut with the inverse function to convert from $F(R)$ back to R. The displacement of the cam follower is converted to a rotary motion by rack and pinion 19 and is used to drive a pen on cylinder 20. Since 20 is mechanically coupled to 1, the spectrophotometric curve (R) of the mixtures is traced out on the paper placed on 20. 21 is a selsyn transmitter which transmits the value R to the integrator so that Equation 2 may be solved.

The device of the present invention is thus a novel combination of mechanical components and machine elements whereby quick evaluation of a proposed color mixture is obtained. The operation of this device is based on the use of reflectance curves of the color components selected for the colorants of the mixture. These reflectance curves are obtained from a spectrophotometer which is a standard device for evaluating the reflectance of any color with respect to a standard, e. g., magnesium oxide. The color mixture equation is based on a $F(R)$ which is a predetermined function of reflectance and is selected to be additive in each specific type of colorant mixture. The primary object of the apparatus is then to evaluate a particular mixture wherein the reflectance of each colorant, as well as the appropriate function of the reflectance $(F(R))$, is given. The latter is represented by pre-cut cams 9, 10, and 11 in the drawings, whereas the reflectance curves are carried by the cylinders 3, 4 and 5. The proportion of each colorant in the mixture is introduced by the setting of the multiplying levers 12, 13 and 14.

The method of operation of the device in conjunction with the automatic tristimulus integrator of my copending application Serial No. 6,541 filed February 5, 1948, is as follows:

In the first method of operation, the recording spectrophotometer and the automatic tristimulus integrator of Figure 1 of said copending patent application may be disconnected and the present device connected only with the integrator portion thereof. Spectrophotometric curves $R_A$, $R_B$ and $R_C$ are placed on the proper cylinders and a blank paper is placed on cylinder 20. The selsyn 1 of the present device is connected by suitable cable or electrical connection with the wavelength receiver selsyn of the automatic tristimulus integrator (elements 24 of the drawings of said copending application Serial No. 6,541). Selsyn 21 of the present device is connected through a suitable cable or electrical connection with the reflectance receiver selsyn of the automatic tristimulus integrator (elements 21 in my said copending application Serial No. 6,541). Multipliers 12, 13 and 14 are set at the desired proportions (which may be estimated by method 2 below), and motor 2 is turned on. The predicted spectrophotometric curve R of the mixture is drawn on cylinder 20, and the predicted tristimulus values are obtained from the integrator. If the curve R or the tristimulus values are not the desired ones, then $a$, $b$ and $c$ may be changed and the process repeated. In this way, the amounts of the three colorants required to match the tristimulus values, or the color of a given sample may be determined.

Cams 9, 10, 11 and 18 are mounted so that they are readily replaceable with other cams. A set of cams with a different function of R will be required for different types of colorant mixtures.

In order to match a given sample, it would be well to know beforehand the approximate values of $a$, $b$ and $c$ required. Since Equation 1 is true, we may also write (3)
$$\int E\bar{x}F(R)d\lambda = a\int E\bar{x}F(R_A)d\lambda + b\int E\bar{x}F(R_B)d\lambda + c\int E\bar{x}F(R_C)d\lambda$$

and similar equations with $\bar{y}$ and $\bar{z}$ substituted for $\bar{x}$. If the values of the integrals (without the multiplying factors $a$, $b$ and $c$) have been determined both for the sample to be matched and the colorants to be used in the match, then simultaneous equations can be solved for the unknowns $a$, $b$ and $c$. The values determined in this manner will not be the exact ones required except in the special case where the spectrophotometric curve of the sample and mixture are identical, but will be close approximations to the values required for a match. By placing these values $a$, $b$, and $c$ in the computer and integrating as previously described, one may note what correction is needed and apply it to the proper multiplying levers. In this manner, the number of trials necessary to determine the required values of $a$, $b$ and $c$ is minimized.

In order to obtain the integrals in Equation 3 the computer of the present invention is operated in conjunction with the automatic tristimulus integrator of my said copending application Serial No. 6,541 and is connected to both the spectrophotometer and integrator portion thereof illustrated in Figure 1. In this case the second method of operation is used and is as follows:

When the spectrophotometric curve $R_A$ is to be drawn, selsyn 1 and its servomotor 2 are connected through a suitable cable or electrical connection to the wavelength selsyn transmitter of the spectrophotometer (element 22 of the Figure 1 of my said copending application). Selsyn and servomotor combination 23 of the present device are connected through a suitable cable or electrical connection to the reflectance transmitter selsyn of the recording spectrophotometer (element 19 of the Figure 1 of said copending application). In this case, the spectrophotometrical reflectance transmitter selsyn (element 19 of the Figure 1 of said copending application) is no longer connected to the receiver selsyn 21. Thus, instead of feeding $R_A$ directly into the integrator it is fed into the selsyn servomotor combination 23 of the computer. However, the wavelength transmitter selsyn (element 22 of the Figure 1 of said copending application) is connected to both the wavelength receiver selsyns (elements 24 of the copending application and element 22 of the computer of the present application). $(a)$ is set at 1, while $(b)$ and $(c)$ are set at zero so that the output of the rack and pinion 17 is simply $F(R_A)$. This value is transmitted to the integrator by means of selsyn 22 which is connected by suitable cable or electrical connection to a selsyn and servomotor combination (illustrated as element 21 of the Figure 1 of my copending application) of said automatic tristimulus integrator. In this manner, the integrals of Equation 3 and similar equations involving $\bar{y}$ and $\bar{z}$ are evaluated.

In the description above is mentioned curve followers 6, 7 and 8. These could be pointed metallic devices adapted to follow a curve cut in a stencil or the like. However, they are preferably optical curve followers adapted to follow a curve on a piece of paper drawn with pen or pencil. Several types of optical curve followers are known, as for example the one described by P. M. S. Blackett and F. C. Williams, in Cambridge Philosophical Source Proceedings, vol. 35, page 494.

What I claim is:

1. In an apparatus for predetermining the reflectance value of a mixture of colorants of which individual spectrophotometric curves are given, computer mechanisms each comprising a cylinder carrying said curve for the respective colorants, means for rotating said cylinders simultaneously at a uniform speed, a curve follower for each cylinder, means for translating the motion of each said follower into corresponding rotary displacement of a cam having the configuration corresponding to the function $F(R)$, follower means for each of said cams, a multiplying lever actuated by each said follower, means interconnecting said levers into a single linear movement and means for translating said linear movement into corresponding rotary motion, cam means having a predetermined configuration representing R of the functiton $F(R)$, a rotating cylinder adapted to carry a curve receiving medium, a stylus cooperating with said medium and means for actuating said stylus in accordance with the movement of said last mentioned cam means, the movement of said stylus being the resultant of the combined operation of said mechanisms, tracing a curve representing the reflectance of the mixture of said colorants.

2. In an apparatus for predetermining the reflectance value of a mixture of colorants of which the individual spectrophotometric curves are given, computer mechanisms each comprising a cylinder carrying said curve for the respective colorant, means for rotating said cylinders simultaneously at a uniform speed, a curve follower for each cylinder, means for translating the motion of each said follower into corresponding rotary displacement of a cam having the configuration corresponding to the function $F(R)$, follower means for each of said cams, a multiplying lever actuated by each said follower, means interconnecting said levers into a single linear movement and means for translating said linear movement into corresponding rotary motion, cam means having a predetermined configuration representing R of the function F(R), a cylinder rotating at the speed of said curve carrying cylinders, and adapted to carry a curve receiving medium, a stylus cooperating with said medium and means for actuating said stylus in accordance with the movement of said last mentioned cam means, the movement of said stylus being the resultant of the combined operation of said mechanisms, tracing a curve representing the reflectance of the mixture of said colorants.

3. In an apparatus for predetermining the reflectance value of a mixture of colorants of which the individual spectrophotometric curve is given, computer mechanisms each comprising a cylinder carrying said curve for the respective colorant, means for rotating said cylinders simultaneously at a uniform speed, a curve follower for each cylinder, means for translating the motion of each said follower into corresponding rotary displacement of a cam having the configuration corresponding to the function F(R), follower means for each of said cams, a multiplying lever actuated by each said follower means, said levers being adjustable in proportion to the amount of the respective colorants, means interconnecting said levers into a single linear movement and means for translating said linear movement into corresponding rotary motion, cam means having a predetermined configuration representing R of the function F(R), a cylinder rotating at the speed of said curve carrying cylinders adapted to carry a curve receiving medium, a stylus cooperating with said medium and means for actuating said stylus in accordance with the movement of said last mentioned cam means, the movement of said stylus being the resultant of the combined operation of said mechanisms, tracing a curve representing the reflectance of the mixture of said colorants.

HUGH R. DAVIDSON.

References Cited in the file of this patent

UNITED STATES PATENTS

| Number | Name | Date |
|---|---|---|
| 1,621,394 | Bertin | Mar. 15, 1927 |
| 2,340,350 | Svoboda | Feb. 1, 1944 |
| 2,442,098 | Shewell et al. | May 25, 1948 |
| 2,540,797 | Stearns, Jr. | Feb. 6, 1951 |
| 2,540,798 | Stearns, Jr. | Feb. 6, 1951 |
| 2,579,220 | Vine | Dec. 18, 1951 |

OTHER REFERENCES

"A Continuous Integraph," V. Bush et al., M. I. T., Dept. of Electrical Engineering, Serial No. 56, January 1927.

"A Small Scale Differential Analyzer," Proceedings of the Royal Irish Academy, H. S. W. Massey, et al., vol. 45, Sect. A, October 4, 1938.

"Relay Devices and Their Application to the Solution of Mathematical Equations," H. Ziebolz, Askania Regulator Co., Chicago, 1940, vol. 1, pages 22, 23, 26, 30, 32; vol. II, Figures 58, 59, 68, 79, 84.

"The Theory of Mathematical Machines," F. J. Murray, Kings Crown Press, N. Y., 1948, pages II-1, II-4, II-7, II-12 relied upon.

Mechanical Computing Mechanisms, Reid and Stromback, "Product Engineering," August 1949, pages 131–135; September 1949, pages 119–123.